United States Patent [19]

Tagami et al.

[11] Patent Number: 5,349,018

[45] Date of Patent: * Sep. 20, 1994

[54] POLYAMIDE-HYDROGENATED POLYBUTADIENE-ACRYLONITRILE COPOLYMERS

[75] Inventors: Toshio Tagami; Osamu Kiyohara, both of Shizuoka, Japan

[73] Assignee: Tomoegawa Paper Co., Ltd., Tokyo, Japan

[ * ] Notice: The portion of the term of this patent subsequent to Sep. 7, 2010 has been disclaimed.

[21] Appl. No.: 820,817

[22] Filed: Jan. 15, 1992

[30] Foreign Application Priority Data

Jan. 17, 1991 [JP] Japan .................................. 3-015631
Jan. 21, 1991 [JP] Japan .................................. 3-019181
Feb. 5, 1991 [JP] Japan .................................. 3-035255

[51] Int. Cl.$^5$ .............................................. C08L 77/00
[52] U.S. Cl. ...................................... 525/92; 525/183; 525/432
[58] Field of Search .......................... 525/183, 432, 92

[56] References Cited

U.S. PATENT DOCUMENTS

| | | | |
|---|---|---|---|
| 2,585,583 | 2/1952 | Pinkney | 525/338 |
| 2,731,439 | 1/1956 | Jones | 525/338 |
| 3,700,637 | 10/1972 | Finch | 525/339 |
| 4,581,417 | 4/1986 | Buding | 525/338 |
| 4,628,072 | 12/1986 | Shiraki | 525/57 |
| 4,843,127 | 6/1989 | Akkapedi | 525/183 |
| 4,996,263 | 2/1991 | Pyke | 525/178 |

FOREIGN PATENT DOCUMENTS

| | | |
|---|---|---|
| 658172 | 3/1938 | Fed. Rep. of Germany . |
| 2529132 | 6/1975 | Fed. Rep. of Germany . |
| 60-60106 | 4/1985 | Japan . |
| 62-3171 | 1/1987 | Japan . |
| 2-72192 | 3/1990 | Japan . |
| 2-105290 | 4/1990 | Japan . |

OTHER PUBLICATIONS

Ogata S. et al, Macromolecules, 1985, 851.

Primary Examiner—Ana L. Carrillo
Assistant Examiner—I. Zemel
Attorney, Agent, or Firm—Lowe, Price, LeBlanc & Becker

[57] ABSTRACT

Polyamide-hydrogenated polybutadiene-acrylonitrile block copolymers having high solubility in organic solvents, good compatibility with other polymers, and excellent thermal resistance and adhesive properties are characterized by comprising block units (A) represented by the following formula (I) and block units (B) represented by the following formula (III):

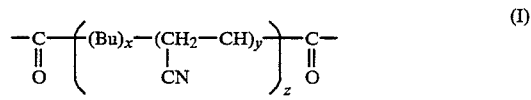

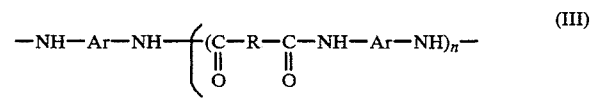

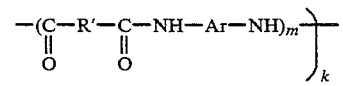

wherein Bu is hydrogenated butadiene radical, R is divalent organic radical, R' is a divalent aromatic group having a hydroxyl group, Ar is an aromatic divalent group represented by the following formulae (1)-(6):

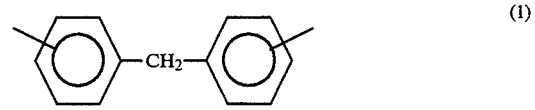

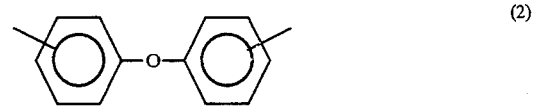

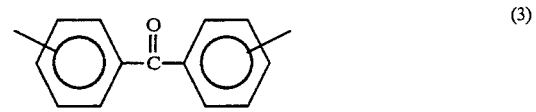

(Abstract continued on next page.)

-continued

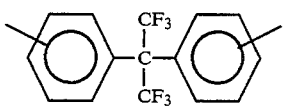 (6)

-continued

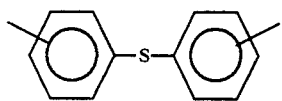 (4)

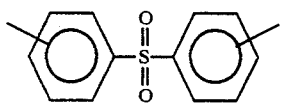 (5)

each of k and z is an average polymerization degree where k is an integer of 2–400, and z is an integer of 5–100, m and n are molar fractions in the copolycondensation, where $m \geq 0.04$, and $m+n=1$, and x and y are molar fractions in the copolymerization, where $x:y = 0.95:0.05$ to $0.6:0.4$, and $x+y=1$, and block units (A) and (B) are contained in the range of 2 to 20, respectively.

4 Claims, No Drawings

POLYAMIDE-HYDROGENATED POLYBUTADIENE-ACRYLONITRILE COPOLYMERS

BACKGROUND OF THE INVENTION

1) Field of the Invention

This invention relates to novel polyamide-hydrogenated polybutadiene-acrylonitrile copolymers and to a process for producing the same.

2) Description of the Related Arts

Polybutadiene has been known to possess a flexible molecular structure, and a polystyrene-polybutadiene copolymer has been known to be an excellent thermoplastic elastomer. However, this copolymer has the problems of softening at a low temperature and being unable to exhibit any sufficient performance at a temperature range exceeding 120° C. In order to solve these problems, a polyamide-polybutadiene type block copolymer has been suggested in which a polystyrene component is substituted by a polyamide component (Japanese Patent Publication No. 3171/87).

Since this block copolymer has problems in terms of its solubility in an organic solvent and its compatibility with other polymers, a polyamide-polybutadiene-acrylonitrile block copolymer has been disclosed in which these problems are improved upon without impairing its thermal resistance (Japanese Patent Application No. 2-105290). This block copolymer, however, has the disadvantage of being unable to melt-mold. A polyamide-hydrogenated type polybutadiene block copolymer has been suggested as one which improves upon this point (Japanese Patent Application No. 2-72192).

However, although the above-described polyamide-acrylonitrile-butadiene type block copolymer, polyamide-polybutadiene block copolymer, and the like which have hitherto been suggested have excellent thermal resistance, high solubility in organic solvents, good compatibility, etc., they have the problems of generating gases (particularly butadiene and cyano type harmful gases) during the thermal decomposition, and being unable to melt-mold. The polyamide-hydrogenated polybutadiene-acrylonitrile copolymers in which this point is improved is capable of melt-molding, but has the problems of compatibility, adhesive properties, etc. in combining with specific macromolecular materials.

This invention has been achieved in light of the problems in the conventional arts as described above.

SUMMARY OF THE INVENTION

An object of this invention is, therefore, to provide a novel polyamide-hydrogenated polybutadiene-acrylonitrile copolymer having good thermal resistance, excellent solubility in solvents and compatibility with other polymers, and capability of melt-molding.

Another object of this invention is to provide a polyamide-hydrogenated polybutadiene-acrylonitrile block copolymer having high solubility in solvents and good compatibility with other polymers, and excelling in thermal resistance and adhesive properties.

A still further object of this invention is to provide a reactive polyamide-hydrogenated polybutadiene-acrylonitrile copolymers.

The first aspect of this invention is a polyamide-hydrogenated polybutadiene-acrylonitrile block copolymer formed by polycondensation between a hydrogenated polybutadiene-acrylonitrile oligomer having carboxyl groups at both its terminals and a polyamide having aminoaryl groups at both its terminals, the block copolymer being characterized by comprising block units (A) represented by the following general formula (I) and block units (B) represented by the following general formula (II):

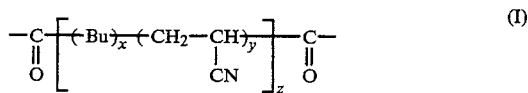

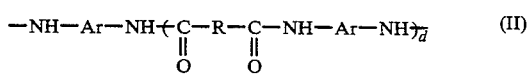

wherein Bu is hydrogenated butadiene radical, Ar is a divalent organic radical represented by the following formulae (1)–(6):

R is a divalent organic group, each d and z is an average polymerization degree where d is an integer of 2–400, and z is an integer of 5–100, and x and y are molar fractions in the copolymerization, where x:y=0.95:0.05 to 0.6:0.4, and x+y=1, and block units (A) and (B) being contained in the range of 2 to 20, respectively.

The second aspect of this invention is a process for producing the above-described polyamide-hydrogenated polybutadiene-acrylonitrile block copolymer, the process being characterized by polycondensating a hydrogenated polybutadiene-acrylonitrile oligomer having carboxyl groups at both its terminals represented by the following general formula (I'):

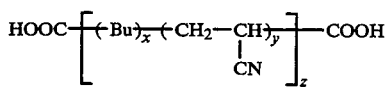
(I')

wherein Bu, x, y, and z have the same meanings as described above, respectively, with a polyamide having aminoaryl groups at both its terminals represented by the following general formula (II'):

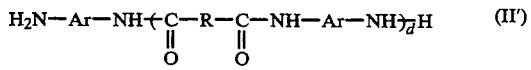
(II')

wherein Ar, R, and d have the same meanings as described above, in the presence of an aromatic phosphite and a pyridine derivative.

The third aspect of this invention is a polyamide-hydrogenated polybutadiene-acrylonitrile block copolymer formed by polycondensation between a polyamide having aminoaryl groups at both its terminals and having a phenolic hydroxyl group, and a hydrogenated polybutadiene-acrylonitrile copolymer having carboxyl groups at both its terminals, which copolymer being characterized by comprising block units (A) represented by the following general formula (I) and block units (B) represented by the following general formula (III):

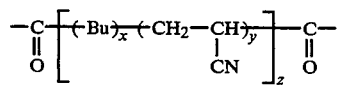
(I)

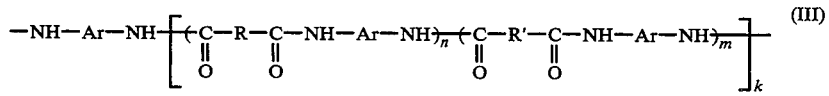
(III)

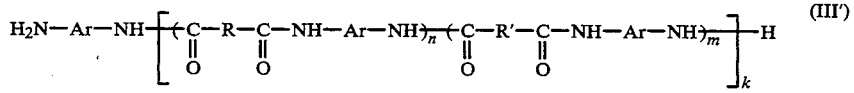
(III')

wherein Bu is hydrogenated butadiene radical, R is a divalent organic radical, R' is a divalent aromatic group having a hydroxyl group, Ar is an divalent organic group represented by the following formulae (1)–(6):

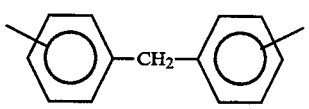
(1)

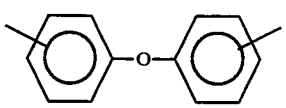
(2)

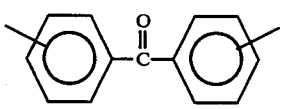
(3)

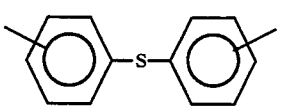
(4)

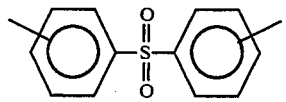
(5)

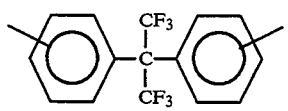
(6)

k and z is an average polymerization degree, where k is an integer of 2–400, and z is an integer of 5–100, m and n are molar fractions in the copolycondensation, where $m \geq 0.04$, and $m+n=1$, and x and y are molar fractions in the polymerization, where x:y=0.95:0.05 to 0.6:0.4, and $x+y=1$, and block units (A) and (B) being contained in the range of 2 to 20 respectively.

The fourth aspect of this invention is a process for producing the above-described polyamide-hydrogenated polybutadiene-acrylonitrile block copolymer, the process being characterized by polycondensating a dicarboxylic acid containing at least 4 mol % of an aromatic dicarboxylic acid containing a phenolic hydroxyl group with an aromatic diamine, polycondensating the polyamide thus synthesized having aminoaryl groups at both its terminals represented by the following general formula (III'):

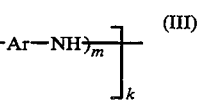
(I')

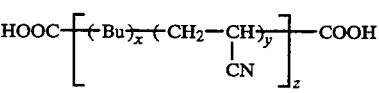
(I')

wherein Bu, x, y, and z have the same meanings as described above, both polycondensations being carried out in the presence of an aromatic phosphite and a pyridine derivative.

The fifth aspect of this invention is a polyamide-hydrogenated polybutadiene-acrylonitrile copolymer comprising a polycondensate of a hydrogenated polybutadiene-acrylonitrile oligomer having carboxyl groups at both its terminals, an aromatic diamine, and a dicarboxlyic acid represented by the following general formula (IV).

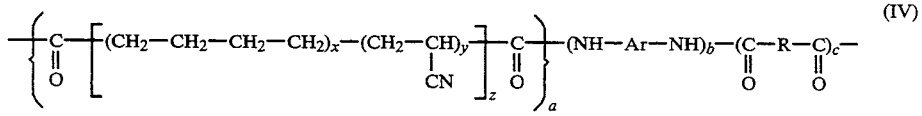

wherein Bu is hydrogenated butadiene radical, R is a divalent organic radical, Ar is a divalent aromatic group represented by the following formulae (1)-(6):

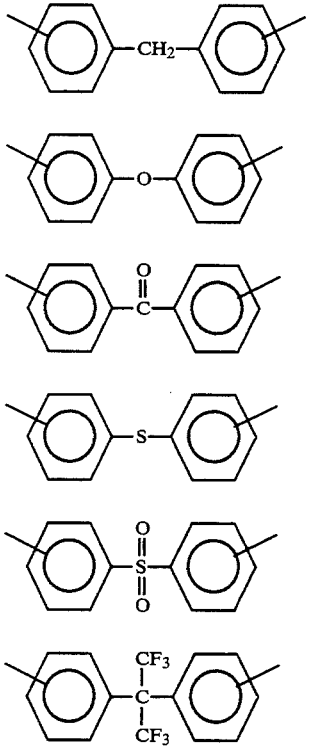

each a, b, and c is a composition ratio, where a and c are independently integers of not less than 1, and b is an integer of not less than 2, b=a+c, z is an average polymerization degree, where z is an integer of 5 to 100, and x and y are molar fractions in the copolymerization, where x:y=0.95:0.05 to 0.6:0.4, and x+y=1.

The sixth aspect of this invention relates to a process for producing the above-described polyamide-hydrogenated polybutadiene-acrylonitrile copolymer, and is characterized by polycondensating a hydrogenated polybutadiene-acrylonitrile oligomer having carboxyl groups at both its terminals represented by the following general formula (I'):

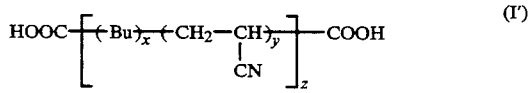

wherein Bu, x, y, and z have the same meanings as described above, with an aromatic diamine represented by the following general formula (V)

wherein Ar has the same meaning as described above, and a dicarboxylic acid represented by the following general formula (VI):

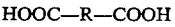

wherein R has the same meaning as described above, in the presence of an aromatic phosphite and a pyridine derivative.

DETAILED DESCRIPTION OF PREFERRED EMBODIMENTS

The present invention will now be described in greater detail.

A divalent organic group represented by the symbol "R" in the general formulae (II), (III), and (IV) in this invention may be any of an aliphatic group, an alicyclic group, or an aromatic group. Consequently, the dicarboxylic acids used for producing the polyamide represented by the general formulae (II') and (III') can be exemplified as follows: isophthalic acid, terephthalic acid, 3,3'-biphenyl dicarboxylic acid, 4,4'-biphenyl dicarboxylic acid, 3,3'- methylene dibenzoic acid, 4,4'-methylene dibenzoic acid, 4,4'-oxydibenzoic acid, 4,4'-thiodibenzoic acid, 3,3'-carbonyl dibenzoic acid, 4,4'-carbonyl dibenzoic acid, 4,4'-sulfonyl dibenzoic acid, 1,4-naphthalene dicarboxylic acid, 1,5-naphthalene dicarboxylic acid, 2,6-naphthalene dicarboxylic acid, succinic acid, glutaric acid, suberic acid, azelaic acid, sebasic acid, undecane diacid, 1,3-cyclohexane dicarboxylic acid, malonic acid, methylmalonic acid, dimethylmalonic acid, adipic acid, 1,10-decane diacid, phenylmalonic acid, benzylmalonic acid, phenylsuccinic acid, 3-phenylglutaric acid, homophthalic acid, 1,3-phenylene diacetic acid, 1,4-phenylene diacetic acid, 4-carboxyphenyl acetic acid, 5-bromo-N-(carbomethyl)-anthranilic acid, 2,5-dihydroxy-1,4-benzene diacetic acid, m-carboxycinnamonic acid, and the like. They can be used alone or in combination of two or more of them.

Of these, preference is given to the aromatic dicarboxylic acids, and, for example, carboxylic acids and derivative thereof such as isophthalic acid, terephthalic acid, 3,3'-biphenyl dicarboxylic acid, 4,4'-biphenyl dicarboxylic acid, 3,3'-methylene dibenzoic acid, 4,4'-methylene dibenzoic acid, 4,4'-oxydibenzoic acid, 4,4'-thiodibenzoic acid, 3,3'-carbonyl dibenzoic acid, 4,4'-carbonyl dibenzoic acid, 4,4'-sulfonyl dibenzoic acid, 1,4-naphthalene dicarboxylic acid, and 2,6-naphthalene dicarboxylic acid can be mentioned.

The aromatic dicarboxylic acid having phenolic hydroxyl group to be used for producing the polyamide of the general formula (III') is not specially limited as long as it possess an aromatic group and a hydroxyl group, typical examples including 4-hydroxyisophthalic acid, 5-hydroxyisophthalic acid, 3-hydroxyphthalic acid, 4-hydroxyphthalic acid, 2-hydroxyterephthalic acid, and derivatives thereof. Particularly, 5-hydroxyterephthalic acid can be mentioned as a preferred one.

These dicarboxylic acids can be used alone or Jointly used. In this invention, it is required to contain 4 mol % or more of the dicarboxylic acid having phenolic hydroxyl group in these dicarboxylic acids based on the total dicarboxylic acid.

The aromatic diamines represented by the above-described formula (V) which are used for preparing the polyamides represented by the general formulae (II') and (III') or as one of the raw material substances include: m-phenylene diamine, p-phenylene diamine, 4,4'-diaminobiphenyl, bis(4-aminophenyl)methane, bis(3-aminophenyl)methane, 4,4'-ethylene dianiline, 2,2'-bis-(p-aminophenyl)propane, 3,4'-oxydianiline, 4,4'-oxydianiline, bis(3-aminophenyl)sulfide, bis(4-aminophenyl)sulfide, 3,3'-diaminobenzophenone bis(3-aminophenyl)sulfone, 1,4-naphthalene diamine, 1,5-naphthalene diamine, 2,6-naphthalene diamine, 1,3-bis(m-aminophenyl) - 1,1,3,3-tetramethyldisiloxane, 2,2-bis (4-aminophenyl) hexafluoropropane, and the like. Furthermore, for the formation of the polyamide of this invention, these aromatic diamines can be used singly or jointly.

For the production of the polyamide having aminoaryl groups at both terminals represented by the above-described formulae (II') and (III') by using the above-described dicarboxlyic acids and the above-described aromatic diamines, it is preferred to carry out the polycondensation in the presence of the aromatic diamines in an amount in excess of the amount of existing dicarboxylic acid. The resulting polyamide preferably possess an inherent viscosity in the range of 0.10 dl/g to 4.0 dl/g, and more preferably 0.20 dl/g to 1.2 dl/g.

On the other hand, as the hydrogenated polybutadiene-acrylonitrile oligomer having the above-described general formula (I') used in the production of the polyamide-hydrogenated polybutadiene-acrylonitrile block copolymer of this invention, those which possess a copolymerization ratio of the butadiene units to the acrylonitrile units in the range of 0.95:0.05 to 0.6:0.4 can be preferably used. Any type can be used as long as its butadiene moiety is connected in the 1,2- or 1,4-position, and it may be produced by any method. Usually it can be produced by anion-or radical-polymerizing butadiene and acrylonitrile to produce a polybutadiene-acrylonitrile copolymer having both terminals carboxylated, and hydrogenating it by the aid of an appropriate hydrogenation catalyst(e.g. Pt, Pd, Ranney Ni, Ru, etc.). As the known processes, the processes described in Japanese Patent Application Laid-Open No. 60106/1985, DE Patent Nos. 658172, and 2529,132, U.S. Pat. No. 3,700,637, etc. have been known. Furthermore, the average polymerization degree (z) of the hydrogenated polybutadiene-acrylonitrile oligomer is suitably ranged from 5 to 100, taking into consideration the tensile strength, tensile elasticity, etc. Particularly, preference is given to those which have a number average molecular weight of 3600±500.

In this invention, the polycondensation of the above-described dicarboxylic acids with the above-described aromatic diamines, and the polycondensation of the polyamides having aminoaryl groups at both terminals with the hydrogenated type polybutadiene-acrylonitrile copolymer having carboxyl groups at both terminals are carried out or the polycondensation of the above described dicarboxylic acids and the above hydrogenated polybutadiene-acrylonitrile copolymer having carboxylic groups at both terminals with the above described aromatic diamines are carried out in the presence of an aromatic phosphite and a pyridine derivative. The aromatic phosphite include, but are not limited to, triphenyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, di-o-chlorophenyl phosphite, tri-p-chlorophenyl phosphite, di-p-chlorophenyl phosphite, and the like. Furthermore, the pyridine derivatives which can be used in this invention together with the aromatic phosphite include pyridine, 2-picoline, 3-picoline, 4-picoline, 2,4-lutidine, 2,6-lutidine, 3,5-lutidine, and the like.

In this reaction, a liquid polymerization process in which a mixed solvent containing the pyridine derivative is used is applied as a rule. The organic solvents used herein are restricted to solvents which are not substantially reacted with both reaction components and the aromatic phosphite. Of these, the solvents which are good solvents for both reaction components and for the reaction product block or random copolymers are proven to be desired. Typical examples of such organic solvents are amide type solvents such as N-methyl-2-pyrrolidone and N,N-dimethylacetamide. In order to obtain these copolymers having a high polymerization degree, it is also possible to add an inorganic salt represented by lithium chloride or potassium chloride to the reaction system.

The process for producing the block or copolymers according to this invention will now be described in greater detail. The process can easily be carried out by heating and stirring the above-described dicarboxylic acid and an excess amount of the above-described aromatic diamine in the presence of the above-described aromatic phosphite and pyridine derivative in the organic solvent represented by N-methyl-2-pyrrolidone under an inert atmosphere such as nitrogen. The block copolymers of this invention are obtained by adding to the polyamide solution thus obtained the hydrogenated type polybutadiene-acrylonitrile copolymer and heating the mixture to bring about the polycondensation.

Furthermore, the random copolymers of this invention can also be obtained by carrying out the polycondensation in the state where the above-described dicarboxylic acid, the aromatic diamine, and the above-described hydrogenated type polybutadiene-acrylonitrile copolymer coexist in a solvent such as N-methyl-2-pyrrolidone. The amount of the aromatic phosphite condensating agent used in each polycondensation is usually equal to or more than the equivalent mol of the carboxyl group. However, the use of 30 times or more amount is not wise from the economic viewpoint.

The amount of the pyridine derivative used herein is required to be equal to or more than the equivalent mol of the carboxyl group. Practically, the use of an excessively large amount is preferred, so that some of pyridine may play a role in the reaction solvent. A mixed solvent comprising organic solvent, such as a mixture of the pyridine derivative with N-methyl-2-pyrrolidone is preferably used here. The mixed solvent is usually used in an amount so as to contain 5-30% by weight of the reaction components.

In the polyamide-hydrogenated polybutadiene-acrylonitrile random copolymer or block copolymer obtained in the manner as described above, the composition ratio of hydrogenated polybutadiene-acrylonitrile copolymer to the polyamide is decided by each charge amount. Generally speaking, as the composition ratio of hydrogenated polybutadiene-acrylonitrile copolymer is increased, the rubber elasticity and the solubility in solvents are increased, but conversely thermal resistance is decreased.

When the equimolar amounts of the reaction components are used under the conditions described above, a block copolymer having an average polymerization degree of 2-20 can be produced. If the average polymerization degree exceeds 20, it is not preferred in terms of processability, but the average polymerization degree may be decreased by using an excess amount of either component for a specific end use. After the reaction is finished, the mixture is incorporated in a non-solvent such as methanol or hexane to separate the formed polymer. Subsequent purification by means of reprecipitation to remove side products, inorganic salts, unreacted monomers, etc. can give a purified block copolymer.

In this invention, in the case where an aromatic dicarboxylic acid having a phenolic hydroxyl group is used for the formation of the polyamide, it is preferred that at least 4 mol % of such an acid is contained, based on the total dicarboxylic acid. This makes it possible to modify the hydroxyl group of the polyamide-hydrogenated polybutadiene-acrylonitrile copolymers with a compound possessing carboxyl group, epoxy group, an acylhalide group, isocyanate group, chlorosulfone group, etc., an acid anhydride, or the like. That is, its phenolic hydroxy group can easily be reacted with such a compound having such a group as, isocyanate, isothiocyanate, diketene, ethylimine, or epoxy to impart a cross-linked structure to the copolymers.

Particularly, it is preferred to utilize a crosslinking reaction with an epoxy compound in terms of the progress of crosslinking reaction under relatively mild conditions, the improvements of thermal resistance and adhesive properties, a wide range of selectivity, low cost, easy handling ability, and others. The epoxy compound is not specifically restricted as long as it possesses at least two epoxy groups. Examples include brominated epoxy, epoxy novolac, bisphenol type epoxy, polyfunctional epoxy, aliphatic epoxy, alicyclic epoxy, compounds containing epoxy, as well as epoxy-modified resin. A large number of compounds are suggested and are commercially available, and any epoxy compound can be selected according to the purpose. Furthermore, a catalyst and a cure accelerator may Jointly be used as occasion demands.

The polyamide-hydrogenated polybutadiene-acrylonitrile random copolymer and block copolymer of this invention have solubility in solvents, good compatibility with other polymers, excellent handling ability and high thermal resistance and adhesive properties. In the case of containing a phenolic hydroxyl group, various properties can be imparted to these copolymers by modifying them with other compounds. These copolymers, therefore, are available as raw materials having a wide utilization range.

Furthermore, according to the process of this invention, any side-reaction and amide-exchange reaction such as the decomposition of butane chains can be avoided without protecting the functional phenolic hydroxyl group, or without causing any reaction of the hydroxyl group with carboxyl or amino group, and without requiring a high temperature during the course of the polycondensation. What is more, the polyamide-hydrogenated polybutadiene-acrylonitrile block copolymer having a restricted construction can easily be produced. Consequently, the process of this invention has great merits.

EXAMPLES

The present invention will now be described in greater detail by referring to working examples, but the invention should not be restricted thereto.

SYNTHETIC EXAMPLE 1

Synthesis of hydrogenated polybutadiene-acrylonitrile oligomer having carboxyl groups at both terminals:

A 1-litter stainless autoclave was charged 200 ml of chlorobenzene and 70 g of nitrile rubber having carboxyl groups at both terminals: Hycar CTBN1008SP (average molecular weight: 3600, acrylonitrile content: 17 mol %). After the atmosphere of the autoclave was replaced with a nitrogen gas, the nitrile rubber was dissolved in chlorobenzene. 20 ml of chlorobenzene in which 0.5 g of catalyst for hydrogenation: tris-(triphenylphosphine)rhodium chloride was dissolved was added through an inlet, while the nitrogen atmosphere was replaced with a hydrogen gas. After the internal hydrogen pressure was adjusted to be 190 millibars, double bonds of butadiene moiety were hydrogenated at 120° C. for 5 hours. After the reaction mixture was cooled down to room temperature, the hydrogen atmosphere was substituted again with a nitogen gas, which was exhausted to result in the atmospheric pressure. The content was poured into 2 litter of water and the catalyst for hydrogenation was filtered out. After the chlorobenzen layer was separated from the aqueous layer, chlorobenzene was distilled off under a reduced pressure to yield the hydrogenated polybutadiene-acrylonitrile oligomer having carboxyl groups at both terminals in a yield of 95.7%.

SYNTHETIC EXAMPLE 2

The same procedure was carried out as in Synthetic Example 1 except that 70 g of nitrile rubber having carboxyl groups at both terminals: Hycar CTBN1300x31 (average molecular weight: 3600, acrylonitrile content: 10 mol %) was used instead of 70 g of Hycar CTBN1008SP (average molecular weight: 3600, acrylonitrile content: 17 mol %), by which hydrogenated polybutadiene-acrylonitrile oligomer having carboxyl groups at both terminals was obtained in a yield of 98.5%.

SYNTHETIC EXAMPLE 3

The same procedure was carried out as in Synthetic Example 1 except that 70 g of nitrile rubber having carboxyl groups at both terminals: Hycar CTBN1300x13 (average molecular weight: 3600, acrylonitrile content: 27 mol %) was used instead of 70 g of Hycar CTBN1008SP (average molecular weight: 3600, acrylonitrile content: 17 mol %), by which hydrogenated polybutadiene-acrylonitrile oligomer having carboxyl groups at both terminals was obtained in a yield of 96.2%.

In the following, the hydrogenated polybutadiene-acrylonitrile oligomer having carboxyl groups at both terminals obtained in Synthetic Example 1 was used in Examples 1-7, that obtained in Synthetic Example 2 was used in Examples 8-16, and that obtained in Synthetic Example 3 was used in Examples 17-21.

EXAMPLE 1

A 100 ml three neck round bottom flask was charged with 1.661 g (10 mmol) of isophthalic acid, 2.202 g (11 mmol) of 3,4'-oxydianiline, 0.33 g of lithium chloride, 1.01 g of calcium chloride, 20 ml of N-methyl-2-pyrrolidone, and 3 ml of pyridine. After the content was stirred to be dissolved, 6.2 g of triphenyl phosphite was added to cause a reaction at 100° C. for 2 hours thereby forming a polyamide having aminoaryl groups at both terminals. To this was added 3.6 g of hydrogenated polybutadiene-acrylonitrile oligomer having carboxyl groups at both terminals (prepared in Synthetic Example 1) which had been added to 20 ml of pyridine, after which the mixture was charged in the reactor and reacted for another 4 hours. After being allowed to cool down to room temperature, the resulting reaction solution was poured into 1 liter of methanol to separate out a polyamide-hydrogenated polybutadiene-acrylonitrile block copolymer of this invention containing 50% by weight of hydrogenated polybutadiene-acrylonitrile moiety.

The inherent viscosity of the resulting block copolymer was found to be 0.22 dl/g (in N,N-dimethylacetamide at 30° C.). The infrared absorption spectrum (measured by Model FX 6160 produced by Analect, the same as above) of this copolymer revealed absorptions around 2800 cm$^{-1}$ and 1300 cm$^{-1}$ corresponding to methylene chain.

EXAMPLE 2

A polyamide having aminoaryl groups at both terminals was formed by following the procedure of Example 1, except that 0.830 g (5 mmol) of isophthalic acid, 0.830 g (5 mmol) of terephthalic acid, and 2.202 g 3,4'-oxydianiline were used as raw material substances. From this, a polyamide-hydrogenated polybutadiene-acrylonitrile block copolymer of this invention containing 50% by weight of hydrogenated polybutadiene-acrylonitrile moiety was separated out as in Example 1.

The inherent viscosity of the resulting block copolymer was found to be 0.21 dl/g (in N,N-dimethylacetamide at 30° C. ). The infrared absorption spectrum of this copolymer revealed absorptions around 2800 cm$^{-1}$ and 1300 cm$^{-1}$ corresponding to methylene chain, and an IR absorption at 1651 cm$^{-1}$ based upon amidecarbonyl.

EXAMPLE 3

A polyamide-hydrogenated polybutadiene-acrylonitrile block copolymer of this invention was obtained by following the procedure of Example 1, except that 2.33 g (11 mmol) of 3,3'-diaminobenzophenone was used instead of 3,4'-oxydianiline in Example 1.

The inherent viscosity of the resulting copolymer was found to be 0.59 dl/g (in N,N-dimethylacetamide at 30° C.). The infrared absorption spectrum of this copolymer revealed absorptions around 2800 cm$^{-1}$ and 1300 cm$^{-1}$ corresponding to methylene chain and 1657 cm$^{-1}$ based upon amidecarbonyl. Furthermore, an absorption at 1720 cm$^{-1}$ based upon carbonyl was also obserbed.

EXAMPLE 4

A polyamide-hydrogenated polybutadiene-acryloni- trile block copolymer of this invention was obtained by following the procedure of Example 1, except that 2.39 g (11 mmol) of (3-aminophenyl)sulfide was used instead of 3,4'-oxydianiline in Example 1.

The inherent viscosity of the resulting copolymer was found to be 0.68 dl/g (in N,N-dimethylacetamide at 30° C. ). The infrared absorption spectrum of this copolymer revealed absorptions around 2800 cm$^{-1}$ and 1300 cm$^{-1}$ corresponding to methylene chain and an absorption at 1651 cm$^{-1}$ based upon amidecarbonyl. Furthermore, an absorption at 1425 cm$^{-1}$ based upon —S— was also observed.

EXAMPLE 5

A polyamide-hydrogenated polybutadiene-acrylonitrile block copolymer of this invention was obtained by following the procedure of Example 1, except that 2.731 g (11 mmol) of (3-aminophenyl)sulfone was used instead of 3,4'-oxydianiline in Example 1.

The inherent viscosity of the resulting block copolymer was found to be 0.71 dl/g (in N,N-dimethylacetamide at 30° C.). The infrared absorption spectrum of this copolymer revealed absorptions around 2800 cm$^{-1}$ and 1300 cm$^{-1}$ corresponding to methylene chain. Furthermore, an absorption at 1657 cm$^{-1}$ based upon amidecarbonyl and absorptions at 1271 cm$^{-1}$ and 1368 cm$^{-1}$ based on —SO$_2$— were also observed.

EXAMPLE 6

A polyamide-hydrogenated polybutadiene-acrylonitrile block copolymer of this invention was obtained by following the procedure of Example 1, except that 2.218 g (11 mmol) of (3-aminophenyl)methane was used instead of 3,4'-oxydianiline in Example 1.

The inherent viscosity of the resulting copolymer was found to be 0.46 dl/g (in N,N-dimethylacetamide at 30° C.). The infrared absorption spectrum of this copolymer revealed absorptions around 2800 cm$^{-1}$ and 1300 cm$^{-1}$ corresponding to methylene chain and an absorption at 1664 cm$^{-1}$ based upon amidecarbonyl.

EXAMPLE 7

A polyamide-hydrogenated polybutadiene-acrylonitrile block copolymer of this invention was obtained by following the procedure of Example 1, except that 3.677 g (11 mmol) of 2,2'-bis(4-aminophenyl)-hexafluoropropane was used instead of 3,4'-oxydianiline in Example 1.

The inherent viscosity of the resulting copolymer was found to be 0.32 dl/g (in N,N-dimethylacetamide at 30° C.). The infrared absorption spectrum of this copolymer revealed absorptions around 2800 cm$^{-1}$ and 1300 cm$^{-1}$ corresponding to methylene chain and around 1300 cm$^{-1}$ based upon -C-F. Furthermore, absorptions around 1657 cm$^{-1}$ based upon amidecarbonyl were observed.

EXAMPLE 8

Into a 50 ml round flask were incorporated 167 mg (1 mmol) of isophthalic acid, 440 mg (2.2 mmol) of 3,4'-oxydianiline, 182 mg of (1 mmol) of 5-hydroxyisophthalic acid (50% by weight based on the total carboxylic acid), 100 mg of lithium chloride, 300 mg of calcium chloride, 8 ml of N-methyl-2-pyrrolidone, and 1 ml of pyridine. After the content was stirred to be dissolved, 1 g of triphenyl phosphite was added to cause a reaction at 80° C. for 2 hours thereby forming a polyamide. The polyamide possessed a inherent viscosity of 0.40 dl/g, and n/(n+m) was 0.5.

To this polyamide was added a solution in which 810 mg of hydrogenated polybutadiene- acrylonitrile oligomer having carboxyl groups at both terminals (prepared in Synthetic Example 2) had been dissolved in 5 ml of pyridine, after which the mixture was further reacted for another 3 hours. After cooling down to room temperature, the resulting reaction solution was poured into 500 ml of methanol to separate out a polyamide-hydrogenated polybutadiene-acrylonitrile block copolymer having a phenolic hydroxyl group of this invention containing 50% by weight of hydrogenated polybutadiene-acrylonitrile moiety. The polymer thus separated was further purified by washing with methanol and methanol-refluxing. The inherent viscosity of the polymer of this invention thus obtained was found to be 1.25 dl/g (in N,N-dimethylacetamide at 30° C.). The infrared absorption spectrum measurement of this block copolymer revealed absorptions around 2800 cm$^{-1}$ and 1300 cm$^{-1}$ corresponding to methylene chain.

EXAMPLE 9

A polyamide-hydrogenated polybutadiene-acrylonitrile block copolymer possessing a phenolic hydroxyl group of this invention containing about 20% by weight of hydrogenated polybutadiene-acrylonitrile moiety was obtained by following the procedure of Example 8, except that the amount of the hydrogenated polybutadiene-acrylonitrile oligomer having carboxyl groups at both terminals was changed to 200 mg. The inherent viscosity of the polymer was found to be 0.65 dl/g (in N,N-dimethylacetamide at 30° C.). The infrared absorption spectrum was similar to that of Example 8, but the absorption originating from methylene chain was reduced.

EXAMPLE 10

A polyamide (inherent viscosity: 0.35 dl/g, n/(n+m)=0.3) was produced by following the procedure of Example 8, except that the amount of 5-hydroxyisophthalic acid used in Example 8 was changed to 109 mg (0.6 mmol) (30 mol % relative to the total aromatic dicarboxylic acid) and that of isophthalic acid was changed to 234 mg (1.4 mmol). A polyamide-hydrogenated polybutadiene-acrylonitrile block copolymer possessing a phenolic hydroxyl group of this invention containing about 20% by weight of hydrogenated polybutadiene-acrylonitrile moiety was obtained as in Example 8. The inherent viscosity of the polymer was found to be 0.60 dl/g (in N,N-dimethylacetamide at 30° C.). The infrared absorption spectrum was similar to that of Example 8.

EXAMPLE 11

A polyamide (inherent viscosity: 0.30 dl/g, n/(n+m)=0.1) was produced by following the procedure of Example 8, except that the amount of 5-hydroxyisophthalic acid used in Example 8 was changed to 36 mg (0.2 mmol) (10 mol % relative to the total aromatic dicarboxylic acid) and that of isophthalic acid was changed to 301 mg (1.8 mmol). A polyamide-hydrogenated polybutadiene-acrylonitrile block copolymer possessing a phenolic hydroxyl group of this invention containing about 50% by weight of hydrogenated polybutadiene-acrylonitrile moiety was obtained as in Example 8. The inherent viscosity of the polymer was found to be 0.60 dl/g (in N,N-dimethylacetamide at 30° C.). The infrared absorption spectrum was similar to that of Example 8.

EXAMPLE 12

A polyamide (inherent viscosity: 0.32 dl/g, n/(n+m)=0.1) was produced by following the procedure of Example 8, except that 0.513 g (2.2 mmol) of 3,3'-diaminobenzophenone was used instead of 440 mg (2.2 mmol) of 3,4'-oxydianiline used in Example 8. A polyamide-hydrogenated polybutadiene-acrylonitrile block copolymer possessing a phenolic hydroxyl group of this invention containing about 50% by weight of hydrogenated polybutadiene-acrylonitrile moiety was obtained as in Example 8. The inherent viscosity of the resulting polymer was found to be 0.60 dl/g (in N,N-dimethylacetamide at 30° C.). The infrared absorption spectrum measurement of this copolymer revealed absorptions around 2800 cm$^{-1}$ and 1300 cm$^{-1}$ corresponding to methylene chain. Furthermore, an absorption at 1657 cm$^{-1}$ based on amidecarbonyl and an absorption at 1720 cm$^{-1}$ based on carbonyl were also obserbed.

EXAMPLE 13

A polyamide (inherent viscosity: 0.36 dl/g, n/(n+m)=0.5) was produced by following the procedure of Example 8, except that 0.475 g (2.2 mmol) of bis(3-aminophenyl)sulfide was used instead of the diamine used in Example 8, and a block copolymer was obtained as in Example 8.

The inherent viscosity of the block copolymer was found to be 0.62 dl/g (in N,N-dimethylacetamide at 30° C.). The infrared absorption spectrum measurement of this block copolymer revealed absorptions around 2800 cm$^{-1}$ and 1300 cm$^{-1}$ corresponding to methylene chain. Furthermore, an absorption at 1657 cm$^{-1}$ based on amidecarbonyl and an absorption at 1425 cm$^{-1}$ based upon —S— were also observed.

EXAMPLE 14

A polyamide (inherent viscosity: 0.37 dl/g, n/(n+m)=0.5) was produced by following the procedure of Example 8, except that 0.546 g (2.2 mmol) of bis(4-aminophenyl)sulfone was used instead of the diamine used in Example 8, and a block copolymer was obtained as in Example 8.

The inherent viscosity of the block copolymer was found to be 0.68 dl/g (in N,N-dimethylacetamide at 30° C.). The infrared absorption spectrum measurement of this block copolymer revealed absorptions around 2800 cm$^{-1}$ and 1300 cm$^{-1}$ corresponding to methylene chain. Furthermore, an absorption at 1661 cm$^{-1}$ based on amidecarbonyl and absorptions at 1217 cm$^{-1}$ and 1386 cm$^{-1}$ based upon —SO$_2$— were also observed.

EXAMPLE 15

A polyamide (inherent viscosity: 0.26 dl/g, n/(n+m)=0.5) was produced by following the procedure of Example 8, except that 0.443 g (2.2 mmol) of bis(4-aminophenyl)methane was used instead of the diamine used in Example 8, and a block copolymer was obtained as in Example 8.

The inherent viscosity of the resulting block copolymer was found to be 0.68 dl/g (in N,N-dimethylacetamide at 30° C.). The infrared absorption spectrum measurement of this block copolymer revealed absorptions around 2800 cm$^{-1}$ and 1300 cm$^{-1}$ corresponding to methylene chain. Furthermore, an absorption at 1661 cm$^{-1}$ based on amidecarbonyl was also observed.

EXAMPLE 16

A polyamide (inherent viscosity: 0.20 dl/g, n/(n+m)=0.5) was produced by following the procedure of Example 8, except that 0.735 g (2.2 mmol) of 2,2-bis(4-aminophenyl)hexafluoropropane was used instead of the diamine used in Example 8, and a block copolymer was obtained as in Example 8.

The inherent viscosity of the block copolymer was found to be 0.36 dl/g (in N,N-dimethylacetamide at 30° C.). The infrared absorption spectrum measurement of this block copolymer revealed absorptions around 2800 cm$^{-1}$ and 1300 cm$^{-1}$ corresponding to methylene chain and around 1300 cm$^{-1}$ based upon —C—F. Furthermore, an absorption at 1664 cm$^{-1}$ based on amidecarbonyl was also observed.

EXAMPLE 17

A 100 ml three neck bottom round flask was charged with 1.661 g (10 mmol) of isophthalic acid, 2.202 g (11 mmol) of 3,4'-oxydianiline, 3.6 g (about 1 mmol) of hydrogenated polybutadiene-acrylonitrile oligomer (prepared in Synthetic Example 3), 0.33 g of lithium chloride, 1.01 g of N-methyl-2-pyrrolidone, and 20 ml of pyridine. After the content was stirred to be dissolved, 6.2 g of triphenyl phosphite was added to cause a reaction at 100° C. for 4 hours. After being allowed to cool down to room temperature, the resulting reaction solution was poured into 1 liter of methanol to separate out a polyamide-hydrogenated polybutadiene-acrylonitrile copolymer of this invention containing 50% by weight of hydrogenated polybutadiene moiety.

The inherent viscosity of the resulting copolymer was found to be 0.34 dl/g (in N,N-dimethylacetamide at 30° C.). The infrared absorption spectrum of this copolymer revealed an absorptions around 2800 cm$^{-1}$ and 1300 cm$^{-1}$ corresponding to methylene chain and an absorption at around 1658cm based upon —NHCO—.

EXAMPLE 18

A polyamide-hydrogenated polybutadiene-acrylonitrile copolymer of this invention was obtained by following the procedure of Example 17, except that 2.334 g (11 mmol) of 3,3'-dioxyaniline was used instead of 3,4'-dioxyaniline in Example 17.

The inherent viscosity of the resulting copolymer was found to be 0.58 dl/g (in N,N-dimethylacetamide at 30° C.). The infrared absorption spectrum of this copolymer revealed an absorptions around 2800 cm$^{-1}$ and 1300 cm$^{-1}$ corresponding to methylene chain, an absorption of carbonyl around 1657cm$^{-1}$ based upon —NHCO—, and an absorption at 1720 cm$^{-1}$ based on carbonyl.

EXAMPLE 19

A polyamide-hydrogenated polybutadiene-acrylonitrile copolymer of this invention was obtained by following the procedure of Example 17, except that 2.731 g (11 mmol) of bis(4-aminophenyl)sulfone was used instead of 3,4'-dioxyaniline in Example 17.

The inherent viscosity of the resulting copolymer was found to be 0.71 dl/g (in N,N-dimethylacetamide at 30° C.). The infrared absorption spectrum measurement of this copolymer revealed absorptions around 2800 cm$^{-1}$ and 1300 cm$^{-1}$ corresponding -1 to methylene chain, an absorption of carbonyl around 1661 cm$^{-1}$ based upon —NHCO—, and absorptions around 1217 cm$^{-1}$ and at 1368 cm$^{-1}$ based on —SO$_2$—.

EXAMPLE 20

A polyamide-hydrogenated polybutadiene-acrylonitrile copolymer of this invention was obtained by following the procedure of Example 17, except that 2.218 g (11 mmol) of bis(4-aminophenyl)methane was used instead of 3,4'-dioxyaniline in Example 17.

The inherent viscosity of the resulting copolymer was found to be 0.46 dl/g (in N,N-dimethylacetamide at 30° C.). The infrared absorption spectrum measurement of this copolymer revealed absorptions around 2800 cm$^{-1}$ and 1300 cm$^{-1}$ corresponding to methylene chain, an absorption of carbonyl around 1664 cm$^{-1}$ based upon —NHCO—.

EXAMPLE 21

A polyamide-hydrogenated type polybutadiene-acrylonitrile copolymer of this invention was obtained by following the procedure of Example 17, except that 3.677 g (11 mmol) of 2,2'-bis(4-aminophenyl)hexafluoropropane was used instead of 3,4'-dioxyaniline in Example 17.

The inherent viscosity of the resulting copolymer was found to be 0.32 dl/g (in N,N-dimethylacetamide at 30° C.). The infrared absorption spectrum measurement of this copolymer revealed absorptions around 2800 cm$^{-1}$ and 1300 cm$^{-1}$ corresponding to methylene chain and around 1300 cm$^{-1}$ based upon —C—F, and an absorption of carbonyl around 1667 cm$^{-1}$ based upon —NHCO—.

I claim:

1. A polyamide-hydrogenated polybutadiene-acrylonitrile block copolymer formed by polycondensation between a polyamide having aminoaryl groups at both its terminals and having a phenolic hydroxyl group, and a hydrogenated polybutadiene-acrylonitrile copolymer having carboxyl groups at both its terminals, the copolymer being characterized by comprising block units (A) represented by the following formula (I) and block units (B) represented by the following formula (III):

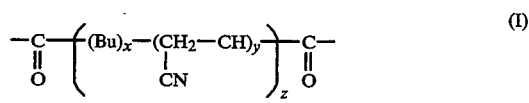

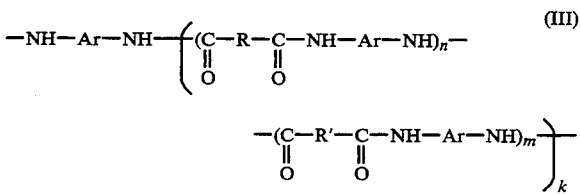

wherein Bu is a hydrogenated butadiene radical, R is a divalent organic radical, R' is a divalent aromatic group having a hydroxyl group, Ar is a divalent aromatic group represented by the following formulae (1)-(6):

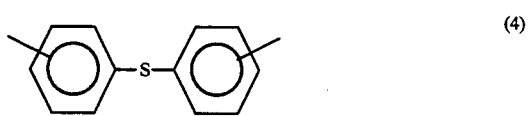

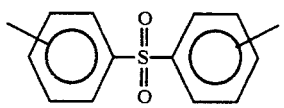

(5)

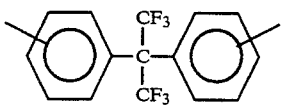

(6)

each of k and z is an average polymerization degree, where k is an integer of 2–400, and z is an integer of 5–100, m and n are molar fractions in the copolycondensation, where m≧0.04, and m+n=1, and x and y are molar fractions in the polymerization, where x:y=0.95:0.05 to 0.6:0.4, and x+y=1, and block units (A) and (B) are contained in the range of 2 to 20 respectively.

2. The block copolymer according to claim 1, wherein R is m-phenylene group, and R' is 5-hydroxy-m-phenylene group.

3. A process for producing the polyamide-hydrogenated polybutadiene-acrylonitrile block copolymer of claim 1, characterized by polycondensating a dicarboxylic acid containing at least 4 mol % of an aromatic dicarboxylic acid containing a phenolic hydroxyl group with an aromatic diamine, polycondensating the polyamide thus synthesized having aminoaryl groups at both its terminals represented by the following formula (III'):

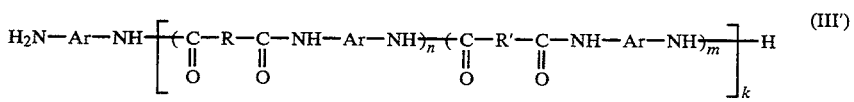

wherein R, R', Ar, k, n, and m have the same meanings as described above, with a hydrogenated polybutadiene-acrylonitrile having carboxyl groups at both its terminals represented by the following formula (I'):

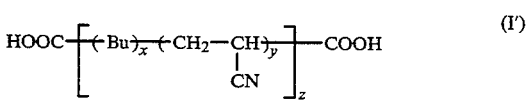

wherein Bu, x, y, and z have the same meanings as described above, both polycondensations being carried out in the presence of an aromatic phosphite and a pyridine derivative.

4. The process according to claim 3, wherein R is m-phenylene group.

* * * * *